United States Patent [19]

Sorensen

[11] Patent Number: 4,844,405
[45] Date of Patent: Jul. 4, 1989

[54] INJECTION MOLDING OF THIN-WALLED PLASTIC PRODUCTS

[75] Inventor: Jens O. Sorensen, Rancho Santa Fe, Calif.

[73] Assignee: Acebo Company, La Jolla, Calif.

[21] Appl. No.: 7,463

[22] Filed: Jan. 26, 1987

[51] Int. Cl.⁴ .................. B29C 39/26; B29C 43/26
[52] U.S. Cl. ........................... 249/124; 249/142; 249/149; 249/151; 249/160; 425/577
[58] Field of Search ............... 249/122, 142, 143, 149, 249/151, 161, 175, 124, 160; 425/577; 164/303, 309, 320

[56] References Cited

U.S. PATENT DOCUMENTS

| | | | |
|---|---|---|---|
| 2,524,858 | 10/1950 | Thomas | 425/577 X |
| 2,787,397 | 4/1957 | Radford | 220/72 |
| 2,859,557 | 11/1958 | Lattuca | 220/72 X |
| 3,070,275 | 12/1962 | Bostrom | 229/1.5 B |
| 3,194,468 | 7/1965 | Baron | 229/1.5 B |
| 3,237,834 | 3/1966 | Davis et al. | 229/1.5 B |
| 3,249,660 | 5/1966 | King | 264/537 |
| 3,424,089 | 1/1969 | Humpherson | 425/577 |
| 3,606,262 | 9/1971 | Vant Hoff | 229/1.5 B X |
| 3,626,051 | 12/1971 | Liautaud | 264/328.8 X |
| 3,754,846 | 8/1973 | Choate | 425/577 |
| 3,767,156 | 10/1973 | Sullivan et al. | 425/577 X |
| 3,917,789 | 11/1975 | Heisler | 264/328.7 X |
| 3,944,124 | 3/1976 | Hexel | 229/1.5 B |
| 4,125,246 | 11/1978 | Von Holdt | 425/577 |
| 4,126,291 | 11/1978 | Gilbert et al. | 425/577 X |
| 4,140,828 | 2/1979 | Copping | 220/72 |
| 4,264,295 | 4/1981 | Hingley | 425/577 |
| 4,285,657 | 8/1981 | Ryder | 425/533 X |
| 4,381,275 | 4/1983 | Sorensen | 264/328.13 X |
| 4,432,530 | 2/1984 | Marcinek | 249/142 |
| 4,467,994 | 8/1984 | Sorensen | 425/577 X |
| 4,474,717 | 10/1984 | Hendry | 425/4 R |
| 4,508,676 | 4/1985 | Sorensen | 264/294 X |
| 4,525,401 | 6/1985 | Pucock | 220/70 |
| 4,598,831 | 7/1986 | Nakamura et al. | 215/1 C |
| 4,627,810 | 12/1986 | Von Holdt | 425/577 |
| 4,670,199 | 6/1987 | Montet | 264/328.12 |

FOREIGN PATENT DOCUMENTS

| | | | |
|---|---|---|---|
| 439693 | 12/1967 | Switzerland | 425/577 |
| 856958 | 12/1960 | United Kingdom | 215/1 C |

*Primary Examiner*—Willard Hoag
*Attorney, Agent, or Firm*—Edward W. Callan

[57] ABSTRACT

A mold for injection molding a plastic product having a thin-walled area includes a first mold part and a second mold part defining a mold cavity therebetween, encompassed by a parting line, for forming the plastic product, and further defining a gate for admitting injected molten plastic into the cavity. The mold parts define a thin cavity region for defining the thin-walled area of the plastic product; and first and second flow channels which are portions of the mold cavity that are thicker than the thin cavity region, for directing the injected molten plastic from the gate into the thin cavity region, whereby the molten plastic directed from the first flow channel joins with the molten plastic directed from the second flow channel. The mold parts further define a meld chamber, which is a portion of the mold cavity that is thicker than the thin cavity region to enhance the melding of plastic flowing from different directions into and joining together in the meld chamber, wherein the thickest portion of the meld chamber is displaced from the gate and the flow channels by the thin cavity region. The meld chamber is at least partially located extensively between the flow channels where molten plastic directed into the thin cavity region by the first flow channel joins molten plastic directed into the thin cavity region by the second flow channel.

8 Claims, 3 Drawing Sheets

INJECTION MOLDING OF THIN-WALLED PLASTIC PRODUCTS

BACKGROUND OF THE INVENTION

The present invention generally pertains to injection molding of thin-walled plastic products and is particularly directed to enhancing the strength of thin-walled plastic products.

A prior art mold for molding thin-walled plastic products having a thin-walled area includes a first mold part and a second mold part defining a mold cavity therebetween, encompassed by a parting line, for forming the plastic product, and further defining a gate for admitting injected molten plastic into the cavity. The mold parts define a thin cavity region for defining the thin-walled area of the plastic product; and first and second flow channels which define boundaries of the thin cavity region, and which are portions of the mold cavity that are thicker than the thin cavity region, for directing the injected molten plastic from the gate into the thin cavity region, whereby the molten plastic directed from the first flow channel joins with the molten plastic directed from the second flow channel. A "flow channel" is defined as a portion of the mold cavity which directs the flow of molten plastic. Thin-walled plastic products made with such molds are structurally weak, especially in the regions where the molten palstic directed from the first flow channel joins with the molten plastic directed from the second flow channel.

SUMMARY OF THE INVENTION

The present invention provides an improved mold for injection molding of thin-walled plastic products using a mold of the type described above.

The mold of the present invention is characterized by the mold parts further defining a meld chamber, which is a portion of the mold cavity that is thicker than the thin cavity region to enhance the melding of plastic flowing from different directions into and joining together in the meld chamber, wherein the thickest portion of the meld chamber is displaced from the gate and the flow channels by the thin cavity region. The meld chamber is at least partially located extensively between the flow channels where molten plastic directed into the thin cavity region by the first flow channel joins molten plastic directed into the thin cavity region by the second flow channel, whereby the strength of the molded thin-walled plastic product is significantly enhanced, particularly in the region of the product defined by the meld chamber.

In a separate aspect of the present invention, the mold is characterized by the respective first and second flow channels being defined by depressions in both the first and second mold parts. This feature may reduce the stacking height of thin-walled plastic products made with such a mold.

Additional features of the present invention are described with reference to the description of the preferred embodiments.

DESCRIPTION OF THE PREFERRED EMBODIMENTS

Figure 1:
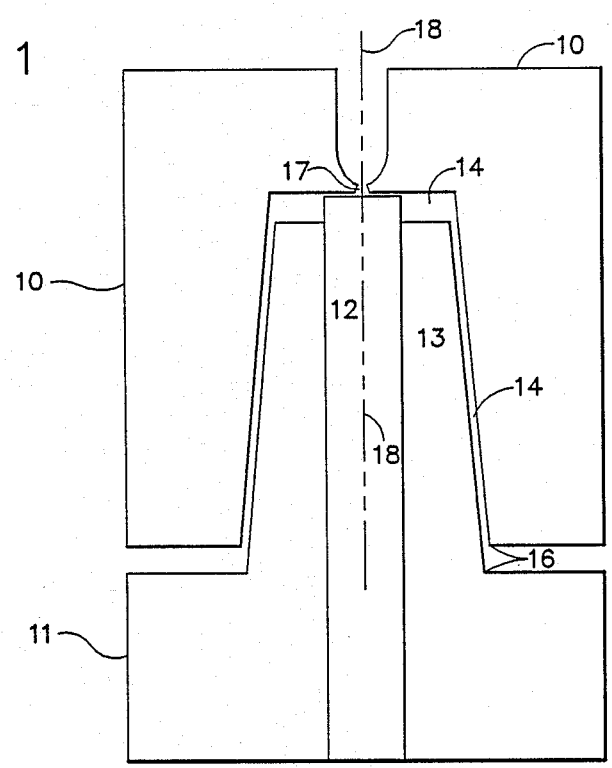
FIG. 1 is a schematic view of amold in a preferred embodiment of the present invention.

Referring to FIG. 1, a mold for use in the present invention includes a hollow mold part 10 and a core mold part 11. The core mold part has a retractable inner portion 12 and an outer portion 13. When clamped together to form the mold, the hollow mold part 10 and the core mold part 11 define a mold cavity 14 therebetween for forming a hollow plastic product. The two mold parts 10, 11 are encompassed by a parting line 16 and further define a gate 17 for admitting molten injected plastic into the mold cavity 14. The mold cavity 14 is centered about an axis 18, and the gate 17 is axially disposed in the mold cavity 14. The retractable inner core portion 12 is axially-movable and when protracted is in contact with the hollow part 10 adjacent the gate 17.

A mold defining such primary and secondary flow channels and the use of such a mold are the subject of a patent application entitled "Stabilized-Core Injection Molding of Hollow Thin-Walled Plastic Products" filed by the present inventor, Jens Ole Sorensen, on Jan. 26, 1987, Ser. No. 7,462.

Figure 2:
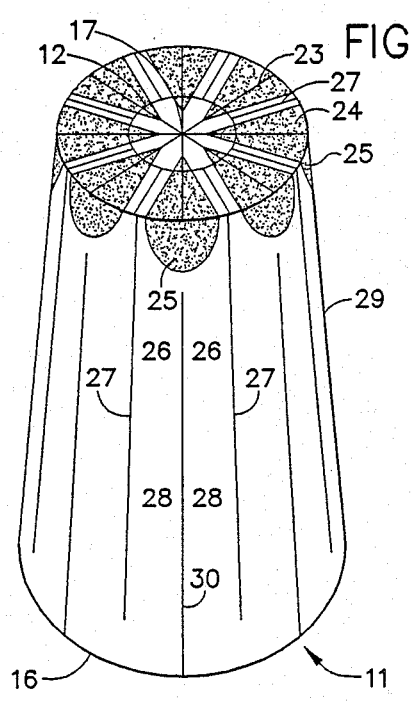
FIG. 2 illustrates a preferred embodiment of a core mold part for use in the mold of FIG. 1 for molding a hollow thin-walled plastic product.

Referring to the preferred embodiment of the core mold part 11 shown in FIG. 2, the mold parts 10, 11 define primary flow channels 23 extending from the gate 17. When the retractable inner portion 12 of the core mold part 11 is protracted, the primary flow channels 23 direct initially injected molten plastic 24 from the gate 17 to create stabilizing regions 25 of stiffened plastic, to thereby impede lateral deflection of the mold parts 10, 11 with respect to each other when additional molten plastic 26 subsequently is injected, whereby the side walls of the molded plastic product formed in the mold cavity 14 are uniformly dimensioned.

The mold parts 10, 11 further define secondary flow channels 27. When the retractable inner portion 12 of the core mold part 11 is protracted, the secondary flow channels 27 exist, but they are isolated from the gate 17. In the portion of the mold cavity 14 defined by the outer portion 13 of the core mold part 11, the secondary flow channels 27 are interposed between the primary flow channels 23. When the retractable inner core portion 12 of the core mold part 11 is retracted, the flow channels 27 are significantly thicker than the thin cavity region 28 of the mold cavity and the average wall-defining thickness of the mold cavity 14 and direct the subsequently injected molten plastic 26 between the stabilizing region 25 of stiffened plastic and into the side-wall-defining region 29 of the mold cavity 14, to thereby enhance the flow of the molten plastic into the side-wall-defining region 29 of the mold cavity 14.

The side-wall-defining regions 29 of the mold cavity 14 includes a thin cavity region 28 for defining the thin-walled areas of the plastic product. The secondary flow channels 27 define boundaries of the thin cavity region 28, and direct the injected molten plastic from the gate 17 into the thin cavity region 28, whereby the molten plastic directed from one secondary flow channel 27 joins with the molten plastic directed from an adjacent secondary flow channel 27.

The mold parts 10, 11 further define meld chambers 30 having their thickest portions displaced from the gate 17 and at least partially located extensively between the secondary flow channels 27 where molten plastic directed into the thin cavity region 28 by one secondary flow channel 27 joins molten plastic directed into the thin cavity region 28 by an adjacent secondary flow channel 27. Each meld chamber 30 is significantly thicker than the thin cavity region 28 for enabling molten plastic directed from one secondary flow channel 27 to meld with the molten plastic directed from the adjacent secondary flow channel 27. The meld chambers 30 extend to the parting line 16 of the mold.

Figure 3:
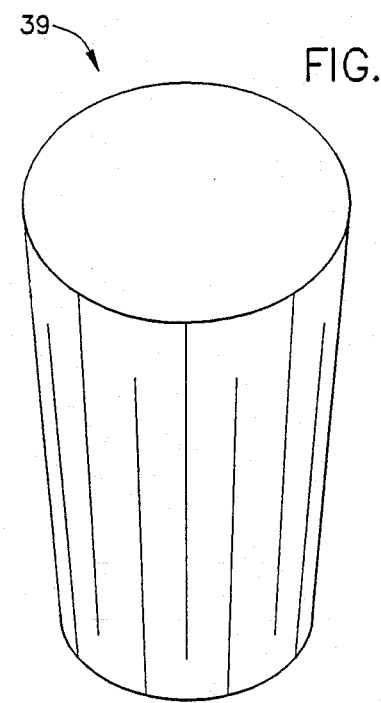
FIG. 3 illustrates a thin-walled plastic product made by using a mold of the present invention.

A thin-walled plastic product 39 molded by using a mold according to the present invention is illustrated in FIG. 3. In such embodiment the flow channels and meld chambers are defined by the hollow mold part.

In an alternative preferred embodiment, the core mold part does not include a retractable portion. In such embodiment, the base portion of the core mold part that is adjacent the gate defines the pattern of flow chambers and meld chambers shown in FIG. 4. The flow channels 40 and meld chambers 44 continue into the side-wall-defining regions of the core mold part 45.

Figure 4:
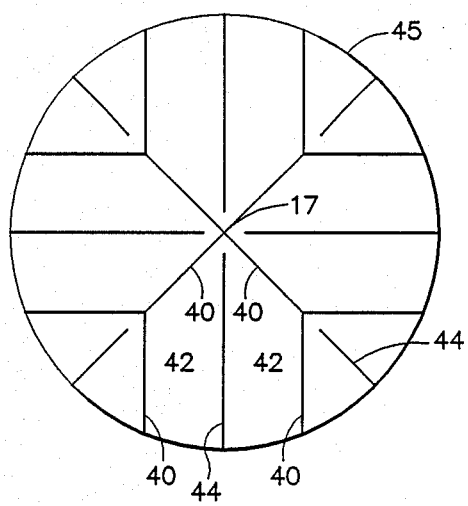
FIG. 4 illustrates a pattern of flow channels, thin cavity regions and meld chambers in a mold cavity defined by the base of the core mold part in an alternative preferred embodiment of the present invention.

Referring to FIG. 4, the mold parts define flow channels 40. The flow channels 40 define boundaries of thin cavity regions 42. The flow channels 40 are portions of the mold cavity that are thicker than the cavity regions 42 for directing injected molten plastic from the gate 17 into the thin cavity regions 42. The molten plastic directed from one flow channel 40 joins with the molten plastic directed from an adjacent flow channel 40. The flow channels 40 are bifurcated in the base region so as to be uniformly disposed about the circumference of the core mold part to define a uniformly dimensioned thin cavity region in the side-wall-defining regions of the mold cavity 14, such as shown in FIG. 2.

The mold parts further define meld chambers 44 in the base region. The thickest portions of the meld chambers 44 are displaced from the gate 17 and the meld chambers 44 are at least partially located extensively between the flow channels 40 where molten plastic directed into the thin cavity region 42 by one flow channel 40 joins molten plastic directed into the thin cavity region 42 by the adjacent flow channel 40. The meld chambers 44 are significantly thicker than the thin cavity region 42 for enabling the molten plastic directed from one flow channel 40 to meld with molten plastic directed from the adjacent flow channel 40.

Figure 5:
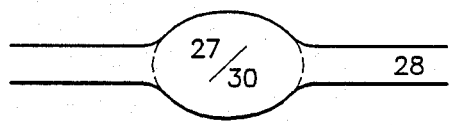
FIG. 5 illustrates a flow channel/meld chamber having an elliptical cross-sectional area as defined by depressions in both mold parts in one preferred embodiment of the present invention.
Figure 6:
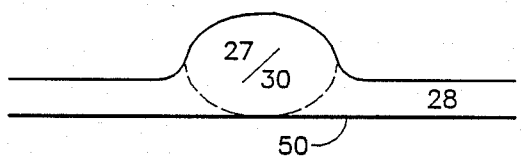
FIG. 6 illustrates a flow channel/meld chamber having an elliptical cross-sectional area as defined by a depression in one mold part in another preferred embodiment of the present invention.
Figure 7:
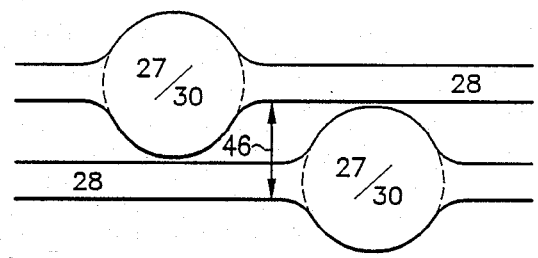
FIG. 7 illustrates the stacking of a pair of plastic products defined by a mold cavity having flow channels and/or meld chambers having circular cross-sectional areas defined by depressions in both the first and second mold parts.
Figure 8:
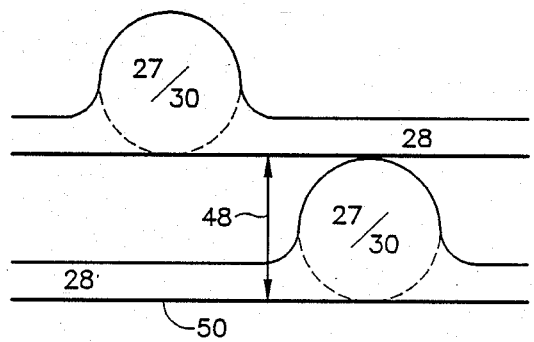
FIG. 8 illustrates the stacking of a pair of plastic products defined by a mold cavity having flow channels and/or meld chambers having circular cross-sectional areas defined by a depression in only one mold part.

The cross-sectional areas of the respective flow channels and meld channels have approximately the same cross-sectional area, and are elliptical as shown in FIGS. 5 and 6. A circular cross-sectional area is preferred, as shown in FIGS. 7 and 8, for enhancing the meld. However, if the dimension of the ellipse normal to the breadth of the thin cavity region 28 is reduced in relation to its perpendicular dimension, the stacking height of conical-shaped products made with the mold, such as shown in FIG. 3, is minimized.

The stacking height of the products also may be minimized by defining the respective flow channels and the meld chambers by depressions in both the first and second mold parts, as shown in FIGS. 5 and 7. The relative stacking heights of products made with molds in which the flow channels and meld chambers are defined by depressions in both mold parts and products made with molds in which the flow channels and meld chambers are defined by depressions in only one mold part are illustrated in FIGS. 7 and 8 respectively. The respective distances 46 and 48 shown in FIGS. 7 and 8 are proportional to the respective stacking heights of such products. The embodiments of FIGS. 6 and 8 are preferred when it is desired to provide a molded product having a relatively uniform surface 50.

I claim:

1. A mold for injection molding a plastic product having a thin-walled area, comprising
 a first mold part and a second mold part defining a mold cavity therebetween, encompassed by a parting line, for forming the plastic product, and further defining a gate for admitting injected molten plastic into the cavity;
 wherein the mold parts define
 a thin cavity region for forming the thin-walled area of the plastic product;
 first and second flow channels, which are portions of the mold cavity that are thicker than the thin cavity region, and define boundaries of said thin cavity region for directing the injected molten plastic into the thin cavity region, whereby the molten plastic directed from the first flow channel joins with the molten plastic directed from the second flow channel; and
 a meld chamber, which is a portion of the mold cavity that is thicker than the thin cavity region, the meld chamber being at least partially located extensively between the flow channels where molten plastic directed into the thin cavity region by the first flow channel joins molten plastic directed into the thin cavity region by the second flow channel, wherein the meld chamber is displaced from the gate and the flow channels by the thin cavity region for enhancing the melding of plastic flowing from different directions into and joining together in the meld chamber.

2. A mold according to claim 1, wherein at least one of the flow channels is bifurcated.

3. A mold according to claim 1, wherein the meld chamber continues to the parting line of the mold.

4. A mold according to claim 1, wherein at least one of the respective flow channels and the meld chamber is defined by depressions in both the first and second mold parts.

5. A mold according to claim 1, wherein the flow channels and the meld chamber have approximately the same cross-sectional areas.

6. A mold according to claim 1, wherein the cross-sectional areas of the flow channels and/or the meld chamber are elliptical.

7. A mold according to claim 1, for injection molding and controlling the dimensions of a hollow plastic product having side walls defined by the thin cavity regions.
wherein one of the mold parts includes a retractable portion adjacent the gate, with the retractable portion being movable between a protracted position and a retracted position while the mold is closed;
wherein the mold parts define primary flow channels extending from the gate, which, when the retractable portion of the one mold part is protracted, direct initially injected molten plastic from the gate to create stabilizing region of stiffened plastic, to thereby impede lateral deflection of the mold parts with respect to each other when additional molten plastic subsequently is injected; and wherein the first and second flow channels defined by the mold parts are secondary flow channels, which are significantly thicker than adjacent portions of the mold cavity; which are adjacent to the gate, but, when the retractable portion is protracted, are isolated from the gate by the retractable portion; which are interposed between the primary flow channels; and which, when the retractable portion is retracted, direct the subsequently injected molten plastic between the stabilizing regions of stiffened plastic and into the side-wall-defining region of the mold cavity beyond the stabilizing regions.

8. A mold according to claim 1, wherein there is a third flow channel isolated from the meld chamber and located between the meld chamber and the gate.

* * * * *